(12) United States Patent
Choi et al.

(10) Patent No.: US 10,065,593 B2
(45) Date of Patent: Sep. 4, 2018

(54) CURTAIN AIRBAG FOR VEHICLE

(71) Applicants: Hyundai Motor Company, Seoul (KR); Kia Motors Corp., Seoul (KR)

(72) Inventors: Jae Ho Choi, Seoul (KR); Tae In Kim, Yongin-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 30 days.

(21) Appl. No.: 15/213,936

(22) Filed: Jul. 19, 2016

(65) Prior Publication Data
US 2017/0182966 A1 Jun. 29, 2017

(30) Foreign Application Priority Data

Dec. 29, 2015 (KR) .................. 10-2015-0188698

(51) Int. Cl.
*B60R 21/232* (2011.01)
*B60R 21/2338* (2011.01)
*B60R 21/231* (2011.01)

(52) U.S. Cl.
CPC ........ *B60R 21/232* (2013.01); *B60R 21/2338* (2013.01); *B60R 2021/23107* (2013.01); *B60R 2021/23386* (2013.01)

(58) Field of Classification Search
CPC .............. B60R 21/232; B60R 21/2338; B60R 2021/23107; B60R 2021/23386
See application file for complete search history.

(56) References Cited

U.S. PATENT DOCUMENTS

| 5,647,609 | A | * | 7/1997 | Spencer | ............... B60R 21/207 280/730.1 |
| 6,237,939 | B1 | | 5/2001 | Resh | |
| 2008/0079246 | A1 | * | 4/2008 | Dix | ...................... B60R 21/232 280/730.2 |
| 2008/0106072 | A1 | * | 5/2008 | Walston | .................. B60R 21/08 280/728.1 |
| 2009/0058053 | A1 | * | 3/2009 | Osterhout | ............. B60R 21/233 280/730.2 |
| 2010/0013203 | A1 | * | 1/2010 | Mitchell | ............... B60R 21/232 280/743.2 |
| 2012/0292891 | A1 | * | 11/2012 | Kraft | ..................... B60R 21/201 280/728.2 |
| 2014/0217710 | A1 | * | 8/2014 | Fukawatase | .......... B60R 21/233 280/730.2 |
| 2015/0191141 | A1 | * | 7/2015 | Wang | .................... B60R 21/232 280/730.2 |

(Continued)

FOREIGN PATENT DOCUMENTS

JP 2006-8105 A 1/2006
JP 2012-20719 A 2/2012

(Continued)

*Primary Examiner* — Darlene P Condra
(74) *Attorney, Agent, or Firm* — Morgan, Lewis & Bockius LLP (57) ABSTRACT

A curtain airbag for a vehicle may include a curtain airbag cushion divided into an upper cushion and a lower cushion, a folding portion at the upper cushion, and a door panel tether having a first end fixed to the folding portion and a second end fixed to a car body, in which when the curtain airbag inflates, a door side of the upper cushion may be pressed by the tension of the door panel tether and the upper cushion turns inward.

18 Claims, 4 Drawing Sheets

(56) References Cited

U.S. PATENT DOCUMENTS

| | | | | |
|---|---|---|---|---|
| 2015/0307054 | A1* | 10/2015 | Fukawatase | B60R 21/232 280/729 |
| 2015/0307057 | A1* | 10/2015 | Moon | B60R 21/232 280/728.2 |
| 2016/0107602 | A1* | 4/2016 | Nakashima | B60R 21/233 280/728.2 |

FOREIGN PATENT DOCUMENTS

| | | |
|---|---|---|
| JP | 2014-151676 A | 8/2014 |
| JP | 2015-85928 A | 5/2015 |
| KR | 10-2004-0079246 A | 9/2004 |
| KR | 10-2014-0074548 A | 6/2014 |

* cited by examiner

CURTAIN AIRBAG FOR VEHICLE

CROSS REFERENCE TO RELATED APPLICATION

The present application claims priority to Korean Patent Application No. 10-2015-0188698, filed on Dec. 29, 2015, the entire contents of which is incorporated herein for all purposes by this reference.

BACKGROUND OF THE INVENTION

Field of the Invention

The present invention relates to a curtain airbag for a vehicle and, more particularly, to a structure of a curtain airbag that prevents a driver from directly hitting the front pillar of a vehicle in the event of an oblique crash.

Description of Related Art

As interest in the safety of passengers in vehicles has increased along with the functionality and convenience of vehicles, the importance of safety-related devices, which can protect passengers in the event of an accident, has increased. Among such safety devices for passengers, an airbag system in particular is basic equipment that distributes shocks applied to a passenger in the event of a collision.

There have been various airbags, including not only airbags that are installed in front of a driver's seat and a passenger's seat, but also a side airbag and a curtain airbag, which are intended to expand alongside a door glass in response to a side collision. In particular, the airbag system for a side collision is generally divided into a system using a curtain airbag for protecting the head of a passenger and a system using a side airbag for protecting the side and the chest of a passenger.

In general, a curtain airbag cushion is elongated along a side of the roof panel of a vehicle in the front-rear direction of the vehicle, so when gas is injected from an inflator, the curtain airbag cushion inflates between the door glasses and passengers, thereby protecting the heads of the passengers in the front and rear seats.

However, the two-dimensional plane curtain airbag of the related art cannot sufficiently protect a driver in an oblique crash, so the driver directly hits the front pillar inside the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a curtain airbag having a structure capable of preventing the head of a driver from directly hitting the frame of a vehicle such as a front pillar between a curtain airbag and a front airbag.

In an aspect of the present invention, there is a curtain airbag for a vehicle that includes: a curtain airbag cushion divided into an upper cushion and a lower cushion formed by cutting a front portion of the curtain airbag cushion at a predetermined distance rearward from an end, a folding portion disposed at the upper cushion and formed at a predetermined position rearward from an end of the curtain airbag cushion, and a door panel tether having a first end fixed to a door side of the folding portion and a second end fixed to a car body, in which when the curtain airbag inflates, a door side of the upper cushion is pushed and the upper cushion is turned inward about the folding portion by tension of the door panel tether.

The curtain airbag may further include: a through-hole formed through the cushion at the folding portion, and an indoor panel tether having a first end fixed to the end of the upper cushion, extending rearward, and passing through the through-hole, in which the first end of the door panel tether may be connected to a second end of the indoor panel tether and the second end of the door panel tether may be fixed to the car body.

The second end of the door panel tether may be extended forward and fixed to a front pillar inside a vehicle.

The second end of the door panel tether may be extended upward and fixed to a side frame of a car body roof.

The end of the lower cushion may be fixed to the front pillar inside the vehicle.

The width of the indoor panel tether may correspond to the up-down width of the through-hole.

The door panel tether may decrease in width as it goes from the first end to the second end.

The distance of the folding portion rearward from the end of the curtain airbag cushion may be longer than the straight distance between an inner side of the curtain airbag cushion and a door side end of a front airbag.

A cutting line dividing the front portion of the curtain airbag cushion into the upper cushion and the lower cushion may extend to a position corresponding to the position of the folding portion.

The through-hole may be formed in a vertical slit shape.

The up-down width of the through-hole may be smaller than the up-down width of the upper cushion.

The end of the upper cushion may further extend toward the front of the vehicle than the end of the lower cushion.

When the curtain airbag fully inflates, the upper cushion may be turned inward by tension of the door panel tether, and the end of the turned upper cushion may be positioned close to an occupant behind the front airbag.

When the curtain airbag fully inflates, the end of the upper cushion may be supported by the front airbag.

According to another aspect of the present invention, there is a curtain airbag for a vehicle that includes: a folding portion formed at a predetermined distance rearward from an end of a curtain airbag cushion, and a door panel tether having a first end that is fixed to a door side of the folding portion, extending forward to a front division point of a front pillar, decreasing in width as the door panel tether goes forward, and having a second end fixed to a car body, in which a door side of an upper cushion is pushed by tension of the door panel tether when the curtain airbag inflates, whereby the upper cushion turns inward the folding portion.

The curtain airbag may further include: a through-hole formed through the cushion at the folding portion, and an indoor panel tether having a first end fixed to the end of the curtain airbag cushion, extending rearward, and passing through the through-hole, in which the first end of the door panel tether may be connected to a second end of the indoor panel tether and the second end of the door panel tether may be fixed to the car body.

According to the curtain airbag for a vehicle of the present invention, it is possible to prevent the head of a driver from directly hitting the frame of a vehicle by the upper cushion and prevent the driver from being thrown out of the vehicle by the lower cushion in an oblique collision of a vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

Figure 1:
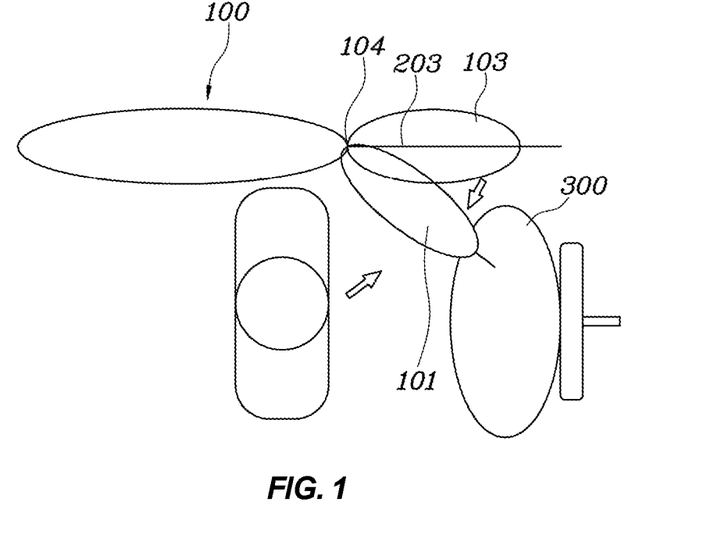
FIG. 1 is a schematic view of a curtain airbag for a vehicle according to an exemplary embodiment of the present invention.
Figure 2:
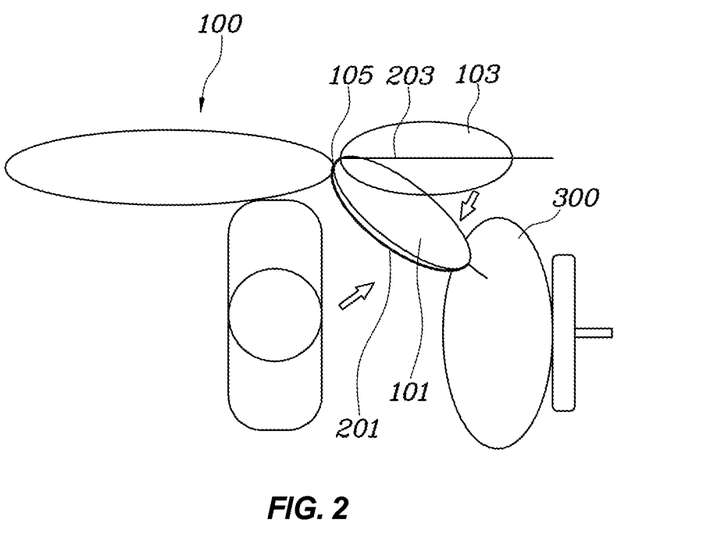
FIG. 2 is a schematic view of a curtain airbag for a vehicle according to another embodiment of the present invention.
Figure 7:
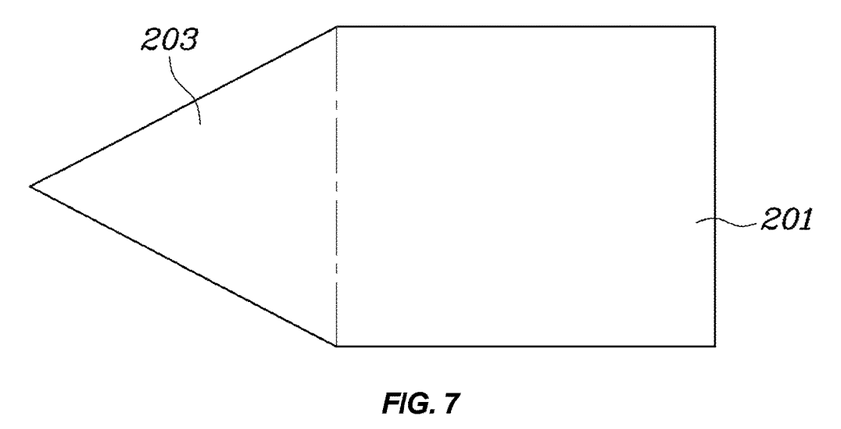
FIG. 7 is a view showing a door panel tether and an indoor panel tether of a curtain airbag for a vehicle according to an exemplary embodiment of the present invention.
Figure 8:
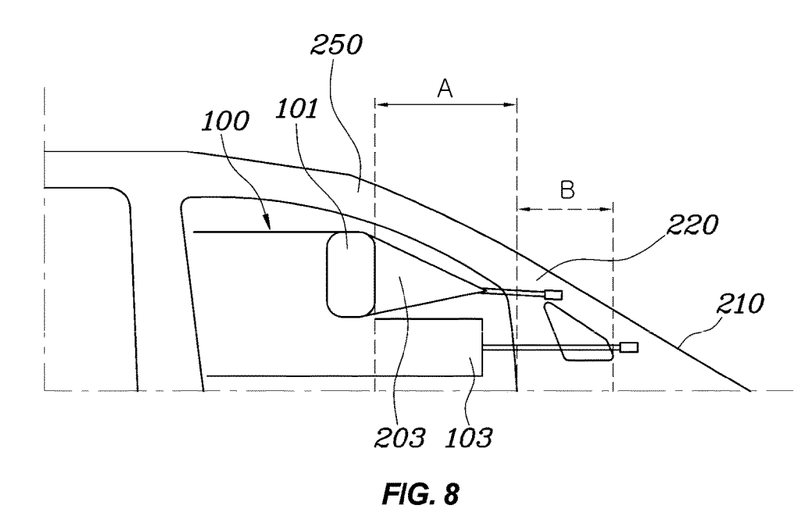
FIG. 8 is a view of a curtain airbag for a vehicle according to another embodiment of the present invention.

FIG. 1 is a schematic view of a curtain airbag for a vehicle according to an exemplary embodiment of the present invention, FIG. 2 is a schematic view of a curtain airbag for a vehicle according to another embodiment of the present invention, and FIGS. 3 to 6 are views showing the fronts of curtain airbags for a vehicle according to various embodiments of the present invention. FIG. 7 is a view showing a door panel tether and an indoor panel tether of a curtain airbag for a vehicle according to an exemplary embodiment of the present invention and FIG. 8 is a view of a curtain airbag for a vehicle according to another embodiment of the present invention.

Figure 3:
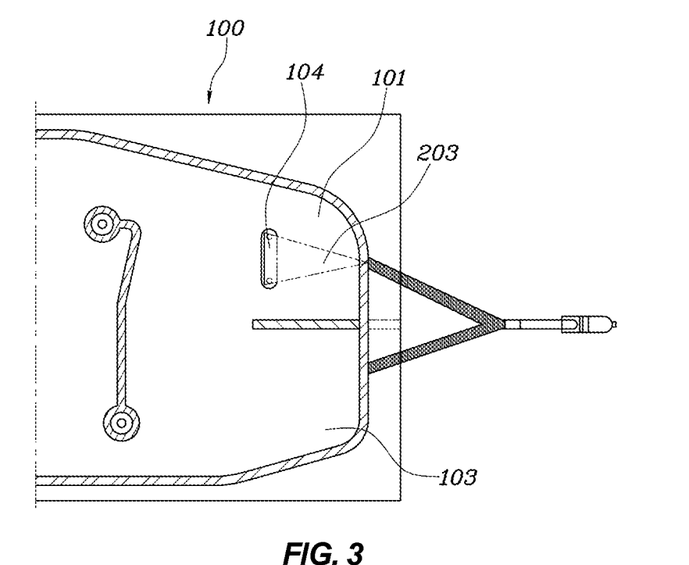
FIG. 3, FIG. 4, FIG. 5, and FIG. 6 are views showing the fronts of curtain airbags for a vehicle according to various embodiments of the present invention.

A curtain airbag for a vehicle according to an exemplary embodiment of the present invention, as shown in FIG. 3, includes: a curtain airbag cushion 100 divided into an upper cushion 101 and a lower cushion 103 formed by cutting a front portion of the curtain airbag cushion at a predetermined distance rearward from an end, a folding portion 104 disposed at the upper cushion 101 and formed at a predetermined position rearward from an end of the curtain airbag cushion, and a door panel tether 203 having a first end fixed to the door side of the folding portion 104 and a second end fixed to a car body 210, in which when the curtain airbag inflates, the door side of the upper cushion 101 is pressed and the upper cushion 101 is turned inward the folding portion 104 by tension of the door panel tether 203.

Although the present invention will be described on the basis of a driver, a curtain airbag is generally installed at the left and right glasses inside a vehicle, so the present invention can be applied to the person in the passenger seat in the same way.

In general, a curtain airbag is elongated along a side of the roof panel of a vehicle in the front-rear direction of the vehicle in order to protect the heads of passengers in the front and rear seats and prevent a driver from being thrown out through a door glass in a crash by being inflated between the passengers and door glasses by an inflator.

Drivers have been protected from a head-on collision and a side collision of a vehicle by a front airbag 300 and a curtain airbag, respectively. However, in an oblique collision rather than a head-on collision, drivers have not been sufficiently protected due to their unexpected movement.

In detail, in an oblique collision, the head of a driver hits the front pillar 220 inside a vehicle through the space between the front airbag 300 and the curtain airbag. Accordingly, as shown in FIGS. 1 and 2, the airbag of the present invention is configured to block the space between the front airbag 300 and the curtain airbag cushion 100 and support the head of a driver by protruding inside in order to prevent the head of the driver from protruding through the space between the front airbag 300 and the curtain airbag.

However, when the front of the curtain airbag cushion 100 is turned inward, the area of the door glass that is covered is correspondingly decreased, so the basic function of a curtain airbag, that is, preventing the egress of a driver, is decreased.

Figure 4:
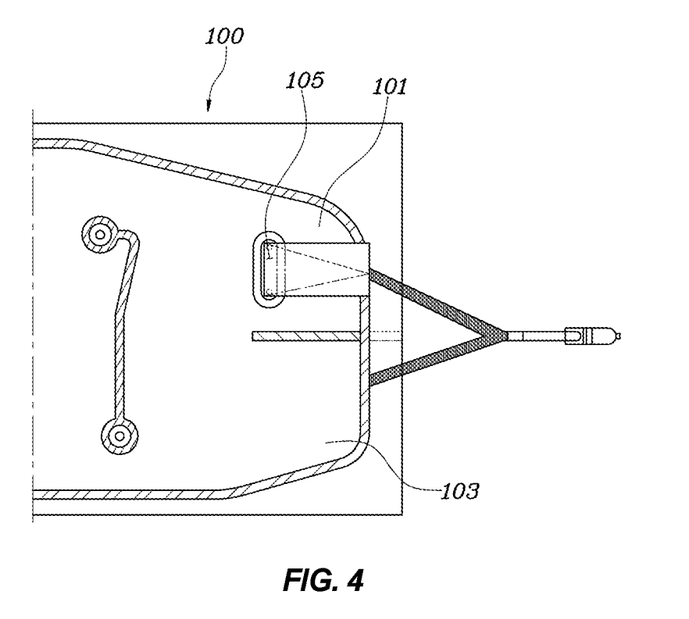
Figure 5:
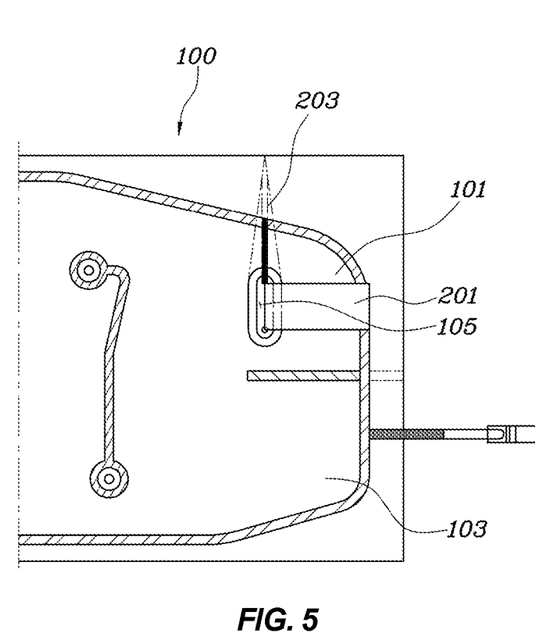

Accordingly, as shown in FIGS. 3 to 5, the present invention provides a structure in which the curtain airbag cushion 100 is divided into the upper cushion 101 and the lower cushion 103 at the front, wherein the upper cushion 101 is turned inward, and the lower cushion 103 is not turned. Accordingly, the inward turning of the upper cushion 101 can support the head of a driver and the lower cushion 103, which does not turn, can prevent the ejection of the driver, so both functions can be achieved.

The way in which the upper cushion 101 is turned is described in detail. Referring to FIG. 1 or 3, the folding portion 104 is formed at a predetermined distance rearward from an end of the airbag cushion to thus turn the front of the upper cushion 101 inward. The folding portion 104 may be formed by sewing such that the cushion does not inflate around the folding portion 104.

Referring to FIGS. 1 and 3, the first end of the door panel tether 203 is fixed to the door side of the folding portion 104 and the second end is fixed to the car body 210, while the position of the second end fixed to the car body or the length of the door panel tether 203 is adjusted so that the door panel tether 203 can apply sufficient tension when the curtain airbag cushion is fully inflated. Accordingly, when the curtain airbag cushion is fully inflated, the upper cushion 101, which can freely move without any fixed position, is turned inward by the tension of the door panel tether 203.

Another way of inflating the upper cushion 101 can be achieved as follows.

Referring to FIGS. 2 and 4, the airbag cushion further includes: a through-hole 105 formed through the cushion at the folding portion 104, and an indoor panel tether 201 having a first end fixed to the end of the upper cushion 101, extending rearward, and passing through the through-hole 105, in which the first end of the door panel tether 203 is connected to the second end of the indoor panel tether 201 and the second end of the door panel tether 203 is fixed to the car body 210. The second end of the door panel tether 203 can be extended forward and fixed to the front pillar 220 inside a vehicle.

Owing to the indoor panel tether 201, which is fixed to the end of the upper cushion 101 and extends inside, a force can be directly applied to the end of the upper cushion 101 and the upper cushion can turn inward. In detail, since the door panel tether 203 is connected not to the folding portion 104 but to the indoor panel tether 201, and is fixed to the car body through the through-hole 105, the door panel tether 203 can directly pull the upper cushion 101 inward.

According to this structure, when the head of an occupant moves in an oblique collision, the force with which the upper cushion 101 supports the head of the occupant can be increased.

The second end of the door panel tether 203 can be extended upward and fixed to the side frame of the car body roof. The end of the lower cushion 103 can be fixed to the front pillar 220 inside a vehicle.

Referring to FIG. 5, because the second end of the door panel tether 203 is extended upward and fixed to the side frame 250 of a car body roof, the direction in which the tension is transmitted by the door panel tether 203 and the indoor panel tether 201 is changed from the front-rear direction to the up-down direction. Accordingly, when tension is transmitted to the upper cushion 101, the upper cushion is turned about the contact point between the upper end of the through-hole 105 and the indoor panel tether 201, and thus a larger force is applied to the lower portion than the upper portion of the indoor panel tether 201. Therefore, when the upper cushion 101 is turned inward, the lower portion is pulled further, and thus the upper cushion 101 is inclined forward. As a result, it is possible to more effectively support the head of a driver, and the front airbag 300 can provide a stable supporting force.

The width of the indoor panel tether 201 may be determined so as to correspond to the length of the through-hole 105.

In general, a tether is used for various purposes such as maintaining the shape or adjusting the position when an airbag inflates, but it must be stored in a small space with an airbag cushion and comes in contact with an occupant when the airbag inflates, so it is made of a flexible material such as fiber. Accordingly, a tether has a property that it is stronger against tensile force than compressive force in the longitudinal direction.

According to an exemplary embodiment of the present invention, as shown in FIG. 2, in order to use the tension from the indoor panel tether 201 and the door panel tether 203, the indoor panel tether 201 connected to an indoor end is passed through the through-hole 105 and the door panel tether 203 is extended to the door glass and then connected to the car body, thereby providing supporting force for the turned upper cushion 101. Further, it is required to apply supporting force to prevent the upper cushion 101 from being stretched if the head of a driver hits the upper cushion 101, and accordingly, a tether having a panel shape with a predetermined width is used to prevent from ripping by the concentration of supporting force on a portion of the cushion. However, since the width corresponds to the up-down width of the through-hole 105, the transmission of tension is not interfered with the through-hole 105.

The door panel tether 203 may decrease in width as it goes from the first end to the second end.

As described above, since the indoor panel tether 201 and the door panel tether 203 are intended to be stored in a small space together with an airbag cushion, a large volume or area is not advantageous. Accordingly, as shown in FIG. 7, the indoor panel tether 201 is given a predetermined width and the door panel tether 203 is given a triangular shape so as to decrease the area thereof.

The distance of the folding portion 104 rearward from the end of the curtain airbag cushion 100 may be made longer than the straight distance between the inner side of the curtain airbag cushion 100 and the door side end of the front airbag 300. The cutting line dividing the front portion of the curtain airbag cushion 100 into the upper cushion 101 and the lower cushion 103 may extend to a position corresponding to the position of the folding portion 104.

When the curtain airbag fully inflates, the upper cushion 101 of the curtain airbag cushion 100 turns inward and the end of the turned upper cushion 101 may be positioned behind the front airbag 300. When the curtain airbag is fully inflated, the end of the upper cushion 101 may be supported by the front airbag 300.

The upper cushion 101, turned inward, blocks the space between the curtain airbag and the front airbag 300 and supports the head of a driver in an oblique collision, whereby it is possible to prevent a primary collision of the head directly with the front pillar 220. However, the larger the impact strength in an oblique collision, the more strongly the head of a driver hits the airbag, and if the upper cushion 101 is not sufficiently fixed, the upper cushion 101 may stretch in response to the movement of the head of the driver, whereby the head may hit the front pillar inside a vehicle.

Accordingly, in an exemplary embodiment of the present invention, as shown in FIG. 1, the folding portion 104 is positioned behind the end shorter than the straight distance between the inner side of the curtain airbag and the door side end of the front airbag 300 such that the turned upper cushion 101 is positioned behind the fully inflated front airbag 300. Therefore, even if the inner panel tether 201 and the door panel tether 203 cannot resist the shock from the head of a driver, the head is supported by the front airbag 300, whereby it is possible to support the head of the driver.

The through-hole 105 may be formed like a vertical slit. The up-down width of the through-hole 104 may be smaller than the up-down width of the upper cushion 101. The end of the upper cushion 101 may extend further toward the front of a vehicle than the end of the lower cushion 103.

Figure 6:
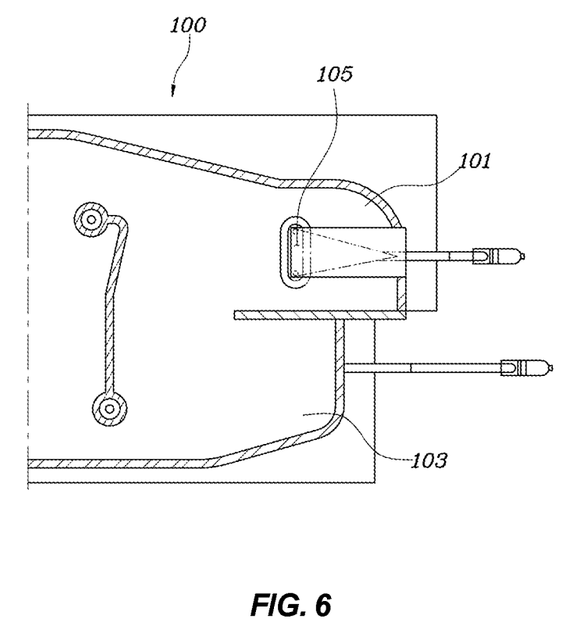

According to an exemplary embodiment of the present invention, as shown in FIG. 6, by extending the end of the upper cushion 101 toward the front of a vehicle further than the end of the lower cushion 103, the degree of turning of the upper cushion 101 can be adjusted.

The degree of turning of the upper cushion 101 can be adjusted on the basis of the position of the through-hole 105, but this cannot be greatly varied, considering the positional relationship between the occupant and the upper cushion 101. Accordingly, by adjusting the degree of turning through further extending the end of the upper cushion 101 toward the front of a vehicle, it is possible to improve the ability to support the head of an occupant in the event of an oblique collision.

When the curtain airbag is fully inflated, the upper cushion 101 is turned inward by the tension of the door panel tether 203, and the end of the turned upper cushion 101 can be positioned close to the driver behind the front airbag. When the curtain airbag is fully inflated, the end of the upper cushion 101 may be supported by and in contact with the front airbag.

A curtain airbag for a vehicle of the present invention includes: a folding portion 104 formed at a predetermined distance rearward from an end of a curtain airbag cushion, and a door panel tether 203 that has a first end fixed to a door side of the folding portion 103, extends forward to a front division point of a front pillar 220, decreases in width as it goes forward, and has a second end fixed to a car body, in which a door side of an upper cushion 101 is pressed by tension of the door panel tether 203 when the curtain airbag is inflated, so the upper cushion can turn inward the folding portion 104.

Referring to FIG. 4, the airbag cushion further includes: a through-hole 105 formed through the cushion at the folding portion 104, and an indoor panel tether having a first end fixed to the end of the curtain airbag cushion, extending rearward, and passing through the through-hole 105, in which a first end of the door panel tether 203 is connected to the second end of the indoor panel tether 201, so the second end of the door panel tether 203 can be fixed to the car body.

FIG. 8 shows a vehicle having a structure in which a front pillar is divided into two parts at a division point at a front portion. In this case, with respect to the division point of the front pillar, the cross-sectional area of front part B is smaller than that of the rear part A and the packaging space for an airbag cushion is small.

Accordingly, as described above in an exemplary embodiment of the present invention, the door panel tether 203 has a triangular shape, the width of which gradually decreases after it passes through the through-hole 105, and extends only to the rear part A of the front pillar. Further, not the door panel tether 203 but a band tether is used at the front part B, where the cross-section of the front pillar is decreased, so that the packaging inside the front pillar can be optimized.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A curtain airbag for a vehicle, comprising:
  a curtain airbag cushion divided into an upper cushion and a lower cushion formed by dividing a front portion of the curtain airbag cushion at a predetermined distance rearward along a longitudinal direction of the vehicle from an end of the curtain airbag cushion;
  a folding portion disposed at the upper cushion and formed at a predetermined position rearward from the end of the curtain airbag cushion; and
  a door panel tether having a first end fixed to a door side of the folding portion and a second end fixed to a car body,
  wherein when the curtain airbag inflates, the upper cushion is turned inward the folding portion by tension of the door panel tether, and the lower cushion is not turned.

2. The curtain airbag of claim 1, further comprising:
  a through-hole formed through the curtain airbag cushion at the folding portion; and
  an indoor panel tether having a first end fixed to an end of the upper cushion, extending rearward, and passing through the through-hole, wherein the first end of the door panel tether is connected to a second end of the indoor panel tether and the second end of the door panel tether is fixed to the car body.

3. The curtain airbag of claim 2, wherein the second end of the door panel tether is extended forward and fixed to a front pillar inside the vehicle.

4. The curtain airbag of claim 3, wherein an end of the lower cushion is fixed to the front pillar inside the vehicle.

5. The curtain airbag of claim 2, wherein the second end of the door panel tether is extended upward and fixed to a side frame of a car body roof.

6. The curtain airbag of claim 5, wherein an end of the lower cushion is fixed to the front pillar inside the vehicle.

7. The curtain airbag of claim 2, wherein a width of the indoor panel tether corresponds to an up-down width of the through-hole.

8. The curtain airbag of claim 2, wherein a cross section of the door panel tether decreases in width as the door panel tether goes from the first end to the second end.

9. The curtain airbag of claim 2, wherein the through-hole is formed in a vertical slit.

10. The curtain airbag of claim 1, wherein a cross section of the door panel tether decreases in width as the door panel tether goes from the first end to the second end thereof.

11. The curtain airbag of claim 1, wherein a distance of the folding portion rearward from the end of the curtain airbag cushion is longer than a straight distance between an inner side of the curtain airbag cushion and a door side end of a front airbag.

12. The curtain airbag of claim 1, wherein a dividing line dividing the front portion of the curtain airbag cushion into the upper cushion and the lower cushion extends to a position corresponding to the position of the folding portion.

13. The curtain airbag of claim 2, wherein an up-down width of the through-hole is smaller than an up-down width of the upper cushion.

14. The curtain airbag of claim 1, wherein the end of the upper cushion further extends toward a front of the vehicle than the end of the lower cushion.

15. The curtain airbag of claim 1, wherein when the curtain airbag fully inflates, the upper cushion is turned inward by tension of the door panel tether, and an end of the turned upper cushion is configured to be positioned close to an occupant behind a front airbag.

16. The curtain airbag of claim 15, wherein when the curtain airbag fully inflates, the end of the upper cushion is supported by the front airbag.

17. A curtain airbag for a vehicle, comprising:
a curtain airbag cushion divided into an upper cushion and a lower cushion formed by dividing a front portion of the curtain airbag cushion at a predetermined distance rearward along a longitudinal direction of the vehicle,
a folding portion formed at a predetermined distance rearward from an end of the curtain airbag cushion; and
a door panel tether having a first end fixed to a door side of the folding portion, extending forward to a division point of a front pillar, decreasing in width as the door panel tether goes forward, and having a second end fixed to a car body,
wherein a door side of the upper cushion is pressed by tension of the door panel tether when the curtain airbag inflates whereby the upper cushion turns inward about the folding portion and the lower cushion is not turned.

18. The curtain airbag of claim 17, further comprising:
a through-hole formed through the curtain airbag cushion at the folding portion; and
an indoor panel tether having a first end fixed to the end of the curtain airbag cushion, extending rearward, and passing through the through-hole,
wherein the first end of the door panel tether is connected to a second end of the indoor panel tether and the second end of the door panel tether is fixed to the car body.

* * * * *